July 26, 1966 J. G. SEVCIK 3,262,136
CUSHION CONSTRUCTION AND METHOD OF FORMING THE SAME
Filed July 25, 1962
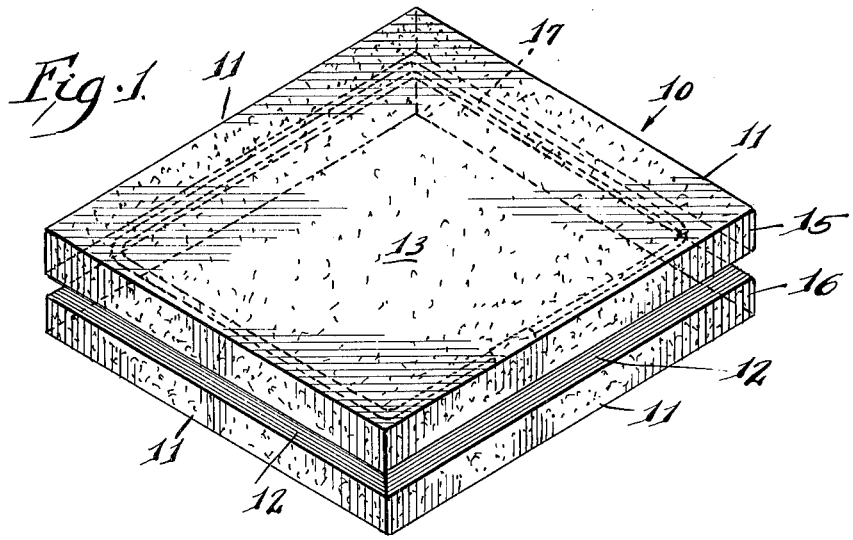
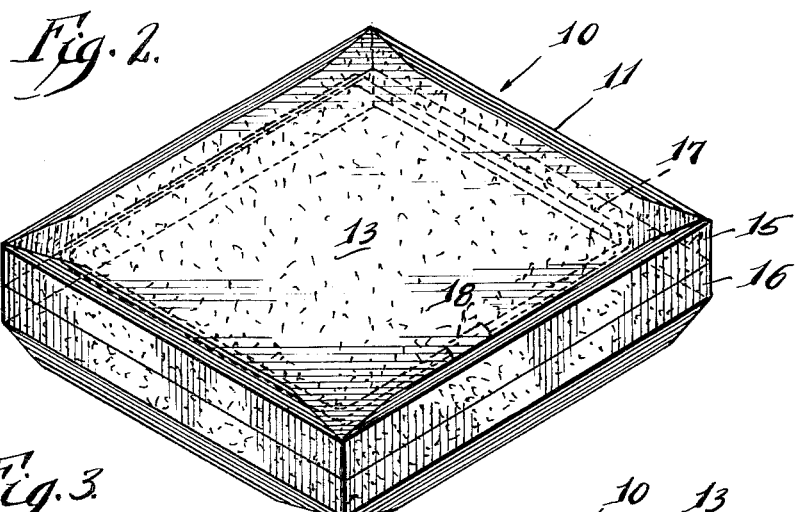
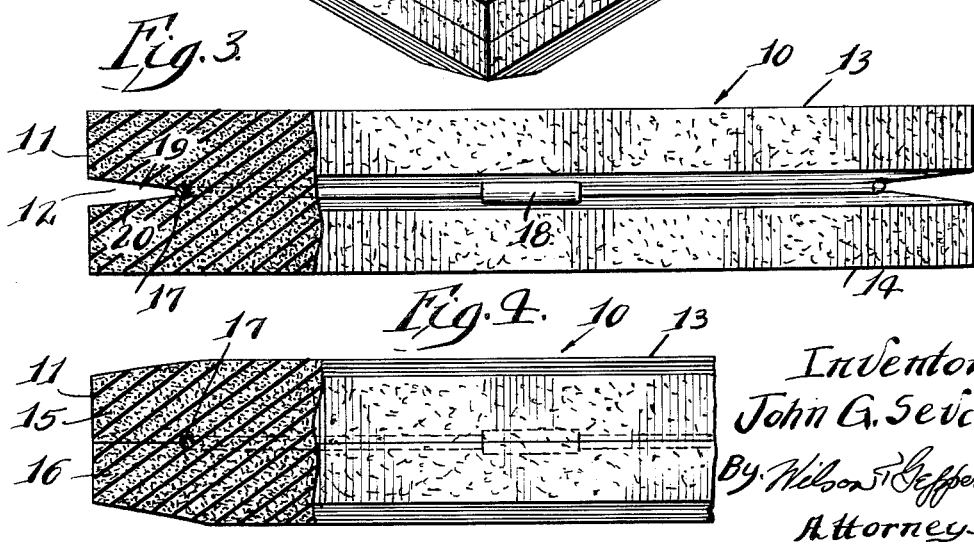
Inventor:
John G. Sevcik
By Nelson T. Geppert
Attorneys.

United States Patent Office 3,262,136
Patented July 26, 1966

3,262,136
CUSHION CONSTRUCTION AND METHOD
OF FORMING THE SAME
John G. Sevcik, Berwyn, Ill., assignor to Burton-Dixie
corporation, Chicago, Ill., a corporation of Delaware
Filed July 25, 1962, Ser. No. 212,433
4 Claims. (Cl. 5—353)

The present invention relates to a novel cushion construction for use in various articles of furniture and for various other uses where a resilient cushion is desired.

Seat cushions of poly-plastics or so-called compounded synthetic rubber or elastomers as presently molded are formed with a center crown to compensate for the weight of the occupant. To provide the molded cushion with a center crown in the manner heretofore performed adds to the difficulty and expense of molding.

It is an important object of the present invention to eliminate the necessity for molding the cushion with a center crown in that the present cushion is molded flat or of substantially uniform thickness and then provided with a continuous V-shaped groove along its peripheral edges, after which the adjoining surfaces defining the V-shaped grooves may be adhesively joined together to provide a continuous peripheral edge of less thickness defining the cushion.

A further object of the present invention is the provision of a molded cushion of resilient material in which the peripheral edges of the molded cushion are grooved or formed in such manner as to reduce their vertical dimensions.

The present invention further comprehends the provision of a novel cushion assembly of molded poly-plastic such as polyethylene or so-called foam rubber in which the thickness of the peripheral edges are grooved and provided with an inner border wire in the bottom of the groove for the purpose of preventing the edges from dishing up or raising when the cushion is occupied.

Another object of the present invention is the provision of a novel method and manner of molding or forming a cushion of resilient material in which the cushion is initially molded with flat upper and lower surfaces after which the peripheral edges are grooved to reduce their vertical dimensions.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawings:

FIGURE 1 is a view in perspective of the novel molded cushion with its peripheral edges grooved.

FIG. 2 is a view similar to FIG. 1 but with the grooved peripheral edges compressed and adhesively joined.

FIG. 3 is a view, part in side or end elevation and part in vertical cross section, of FIG. 1.

FIG. 4 is a fragmentary view, part in side or end elevation and part in vertical cross section, of FIG. 2.

Referring to the disclosure in the drawing in which is shown an illustrative embodiment of the present invention, the resilient cushion 10 is molded of a poly-plastic composition such as polyethylene or so-called foam rubber. To avoid the necessity of molding such a cushion to create a center crown as is conventional, the present invention provides for molding the cushion of substantially uniform thickness and then decreasing the aggregate thickness at the periphery or edges 11 by providing these edges with an outwardly opening V-shaped slot or groove 12 extending continuously about the periphery intermediate the top surface 13 and bottom surface 14 thereof to define spaced portions 15 and 16. The V-shaped groove 12 is generally formed by cutting the groove into the periphery of the cushion and removing the wedge of material in the V-shape cut.

To avoid dishing of the cushion at its peripheral edges 11 when occupied, I preferably reinforce the border by incorporating or embedding a continuous border wire 17 within the groove or slot 12 at the point or bottom of the V, with the ends of the wire joined by a sleeve coupling or connector 18.

An adhesive may be applied to the adjoining surfaces 19 and 20 defining the slot or groove 12 so that when the peripheral edge portions 15 and 16 are compressed, the groove 12 is retained closed in the manner shown in FIG. 4.

Thus the present invention overcomes the need for molding the cushion to create a center crown. By incorporating the inner border wire 17, the peripheral edges are reinforced and the surface of the cushion is retained straight and prevented from dishing up at the sides, especially when a person of substantial weight is seated thereon.

Having thus disclosed the invention, I claim:

1. A resilient cushion of molded plastic composition for an article of furniture, consisting of a block of the plastic composition of substantially uniform thickness having flat upper and lower surfaces and substantially vertical peripheral edges in which the peripheral edges of the cushion are provided with a continuous outwardly opening V-shaped groove cut into the material intermediate the top and bottom surfaces of the cushion with the inclined sides defining the groove adhesively joined uniformly decreasing the thickness of the cushion along its peripheral edges.

2. A resilient cushion for an article of furniture, said cushion comprising a substantially rectangular block of substantial thickness of molded polyethylene having parallel upper and lower surfaces, each of the substantially vertical edges of the periphery of the cushion having an outwardly opening substantially V-shaped continuous slot cut into the material intermediate its upper and lower surfaces with the sides defining the slot adhesively joined together to form peripheral edges of a decreased thickness, the surfaces of the cushion adjacent said peripheral edges having opposed inclined upper and lower surfaces to provide a uniformly decreased thickness outlining the cushion and a reinforcing wire embedded in the apex of the slot for reinforcing the edges of the cushion and preventing them from dishing upwardly when the cushion is occupied.

3. The method for forming a resilient cushion for an article of furniture, consisting of the steps of molding a plastic composition to provide a resilient member of substantially uniform thickness throughout, cutting an outwardly opening V-shaped peripheral groove in the edges of said member and removing the cut out material intermediate its top and bottom surfaces to provide divided edge portions, and adhesively joining the surfaces defining said cut out groove to provide substantially vertically disposed edge portions of a decreased aggregate thickness about the complete periphery of the resulting cushion.

4. The method of forming a resilient cushion for an article of furniture, consisting of the steps of molding a plastic composition to provide a resilient member of substantially uniform thickness throughout, cutting an outwardly opening V-shaped peripheral and continuous groove in the edges of said member and removing the cut out material intermediate its top and bottom surfaces to provide divided edge portions, inserting a reinforcing wire in the apex of the groove to reinforce the edges of said member, and adhesively joining the edge portions to provide the periphery of said member of a uniformly decreased thickness substantially less than the remainder of the resulting cushion.

References Cited by the Examiner

UNITED STATES PATENTS

| | | | |
|---|---|---|---|
| 1,599,054 | 9/1926 | Lehr. | |
| 2,184,970 | 12/1939 | Allen | 156—254 XR |
| 2,184,971 | 12/1939 | Allen | 156—254 XR |
| 2,201,669 | 5/1940 | Kraft | 18—53 XR |
| 2,785,739 | 3/1957 | McGregor et al. | 5—361 XR |
| 2,874,758 | 2/1959 | Jones | 5—361 XR |

ALEXANDER H. BRODMERKEL, *Primary Examiner.*

MORRIS LIEBMAN, *Examiner.*

P. E. ANDERSON, *Assistant Examiner.*